United States Patent
Lam et al.

(10) Patent No.: US 12,106,056 B2
(45) Date of Patent: Oct. 1, 2024

(54) NATURAL LANGUAGE PROCESSING OF STRUCTURED INTERACTIONS

(71) Applicant: Hireguide PBC, Santa Monica, CA (US)

(72) Inventors: Jason T. Lam, Scarborough (CA); Joel D. Young, Milpitas, CA (US); Honglei Zhuang, Santa Clara, CA (US); Netanel Weizman, San Jose, CA (US); Scott C. Parish, Santa Monica, CA (US); Bryan N. Cavanagh, Wheat Ridge, CO (US); Christopher C. Cole, Santa Monica, CA (US); Alycia M. Damp, Toronto (CA); Eszter Fodor, London (GB); Laura A. Kruizenga, Hennepin, MN (US); Janice C. Oh, San Leandro, CA (US); Rachel M. Policastro, Denver, CO (US); Geoffrey C. Thomas, Denver, CO (US); Gregory A. Walloch, Grass Valley, CA (US)

(73) Assignee: HIREGUIDE PBC, Santa Monica, CA (US)

( * ) Notice: Subject to any disclaimer, the term of this patent is extended or adjusted under 35 U.S.C. 154(b) by 268 days.

(21) Appl. No.: 17/745,230

(22) Filed: May 16, 2022

(65) Prior Publication Data

US 2023/0177275 A1 Jun. 8, 2023

Related U.S. Application Data

(60) Provisional application No. 63/285,976, filed on Dec. 3, 2021.

(51) Int. Cl.
G06F 40/35 (2020.01)
G06F 40/279 (2020.01)

(52) U.S. Cl.
CPC .......... *G06F 40/35* (2020.01); *G06F 40/279* (2020.01)

(58) Field of Classification Search
CPC ........ G06F 40/35; G06F 40/279; G06F 40/30
See application file for complete search history.

(56) References Cited

U.S. PATENT DOCUMENTS 9,128,915 B2 * 9/2015 Qian ...................... G06F 40/129
9,495,955 B1 * 11/2016 Weber .................. G10L 15/063
(Continued)

OTHER PUBLICATIONS

Raheja et al., "Dialogue Act Classification with Context-Aware Self-Attention", reprearXiv: 1904.02594v2 [cs.CL] May 6, 2019, 7 pages.

(Continued)

*Primary Examiner* — Bhavesh M Mehta
*Assistant Examiner* — Darioush Agahi
(74) *Attorney, Agent, or Firm* — Squire Patton Boggs LLP; Chia-Hsin Suen

(57) ABSTRACT

One embodiment of the present invention sets forth a technique for analyzing a transcript of a structured interaction. The technique includes determining a first portion of the transcript that corresponds to a first dialogue act. The technique also includes matching the first portion of the transcript to a first component of a script for the structured interaction based on a first set of embeddings for the first portion of the transcript and a second set of embeddings associated with the first component of the script. The technique further includes causing a first mapping between the first portion of the transcript and the first component to be outputted.

16 Claims, 7 Drawing Sheets

(56) References Cited

U.S. PATENT DOCUMENTS

| | | | |
|---|---|---|---|
| 10,958,779 B1* | 3/2021 | Rule | H04M 3/54 |
| 2007/0143322 A1* | 6/2007 | Kothari | G06F 40/194 |
| 2017/0270123 A1* | 9/2017 | Jhamtani | G06F 16/4393 |
| 2018/0174055 A1* | 6/2018 | Tirumale | H04L 51/04 |
| 2021/0157809 A1* | 5/2021 | Mor | G06F 16/27 |
| 2021/0304107 A1* | 9/2021 | Fink | G06Q 10/06398 |
| 2021/0383127 A1* | 12/2021 | Kikin-Gil | G06V 10/811 |
| 2022/0067282 A1* | 3/2022 | Suhara | G06F 16/35 |
| 2023/0022845 A1* | 1/2023 | Meng | G06F 40/279 |
| 2023/0025114 A1* | 1/2023 | Magu | G10L 15/22 |
| 2023/0035155 A1* | 2/2023 | Huang | H04N 7/147 |

OTHER PUBLICATIONS

Karpukhin et al., "Dense Passage Retrieval for Open-Domain Question Answering", arXiv:2004.04906v3 [cs.CL] Sep. 30, 2020, 13 pages.

Liu et al., "RoBERTa: A Robustly Optimized BERT Pretraining Approach", arXiv: 1907.11692v1 [cs.CL] Jul. 26, 2019, 13 pages.

* cited by examiner

NATURAL LANGUAGE PROCESSING OF STRUCTURED INTERACTIONS

CROSS-REFERENCE TO RELATED APPLICATIONS

This application claims benefit of United States Provisional Patent Application titled "FRAMEWORK FOR GENERATING AND ANALYZING INTERVIEW CONTENT," filed Dec. 3, 2021, and having Ser. No. 63/285,976. The subject matter of this related application is hereby incorporated herein by reference.

BACKGROUND

Field of the Various Embodiments

Embodiments of the present disclosure relate generally to data processing and machine learning and, more specifically, to natural language processing of structured interactions.

Description of the Related Art

Recent technological advances have allowed meetings, events, and other structured interactions to be conducted more efficiently and effectively. For example, network-enabled devices have been deployed with computer-based platforms that allow people to conduct teleconferences across multiple remote locations instead of requiring all participants to be in the same physical location. These platforms can also allow the participants to record video and/or audio during both in-person and remote interactions, generate transcripts from recordings of the interactions, share notes and minutes with one another, find meeting times that work best for most or all participants, and/or interact or collaborate within a virtual or augmented environment.

However, computer-based platforms for conducting or capturing interactions have limited capabilities in annotating, instrumenting, or semantically analyzing the interactions. As a result, interactions that are conducted or captured via computer-based platforms can be carried out, managed, or analyzed in an inefficient or resource-intensive manner.

In this respect, a teleconferencing system can be used to conduct a meeting, lecture, question-and-answer (Q&A) session, and/or another type of event involving multiple users and network-enabled devices. The teleconferencing system allows each user to join the event using a separate device; see and/or hear some or all participants in the event; send and receive chat messages with some or all participants in the event; and/or view or share screens, virtual whiteboards, documents, and/or other types of content. The teleconferencing system can also provide a recording or transcript of audio, video, chat messages, screen shares, and/or other content that was captured or shared during the event. However, the teleconferencing system typically does not provide guidance on the structure or content of the interaction. Instead, users responsible for organizing or running the event commonly use word processors, presentation programs, or other general-purpose applications to create, share, or review content related to the event. After the event has concluded, the users can interact with the same types of general-purpose applications to analyze and/or derive insights from a recording of the event and/or other data captured or generated during the event. Because these general-purpose applications are not customized to the types of content, structure, or goals of the events, the users can spend large amounts of time interacting with the general-purpose applications to create or review the content and data.

As the foregoing illustrates, what is needed in the art are more effective techniques for generating, collecting, sharing, and analyzing content and data related to structured interactions.

SUMMARY

One embodiment of the present invention sets forth a technique for analyzing a transcript of a structured interaction. The technique includes determining a first portion of the transcript that corresponds to a first dialogue act. The technique also includes matching the first portion of the transcript to a first component of a script for the structured interaction based on a first set of embeddings for the first portion of the transcript and a second set of embeddings associated with the first component of the script. The technique further includes causing a first mapping between the first portion of the transcript and the first component to be outputted.

One technical advantage of the disclosed techniques relative to the prior art is that computer-based tools for planning, conducting, and reviewing a structured interaction are adapted to the structure or content of the interaction. Accordingly, the disclosed techniques reduce user input, resource overhead, and/or time required to conduct and evaluate structured interactions on computer-based platforms, compared with conventional techniques that involve the use of general-purpose applications to generate or analyze content or data related to structured interactions. Another technical advantage of the disclosed techniques is the generation of a transcript that is "enriched" with dialogue acts, attributes, and/or mappings to portions of a corresponding script. Consequently, the transcript improves the analysis and review of a corresponding structured interaction, compared with a conventional transcript that includes only utterances and speakers associated with the utterances. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
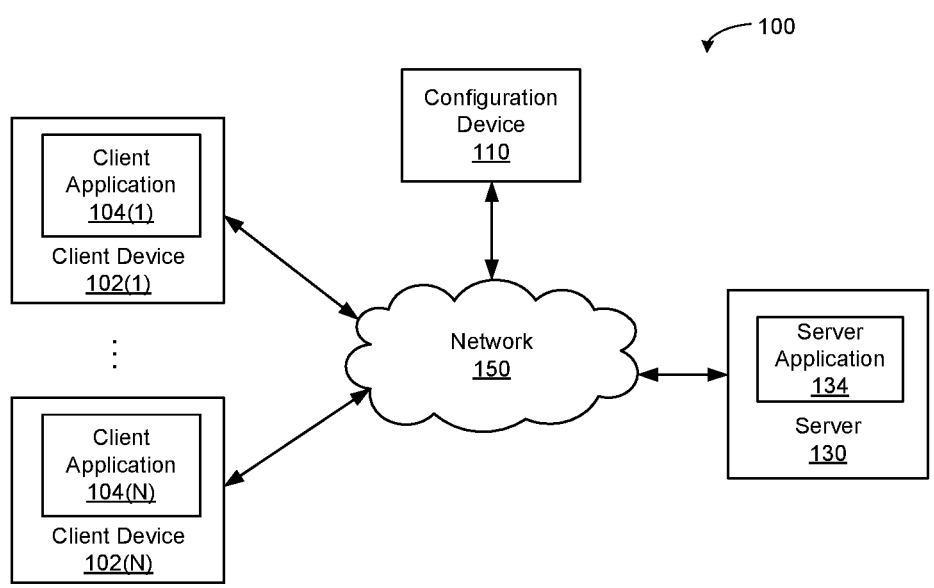
FIG. 1 illustrates a system configured to implement one or more aspects of various embodiments.

FIG. 1 illustrates a system 100 configured to implement one or more aspects of the present disclosure. As shown in FIG. 1, system 100 includes, without limitation, a server 130, a configuration device, 110, and a number of client devices 102 (1)-(N), each of which is referred to individually as a client device 102. Server 130, client devices 102 (1)-(N), and configuration device 110 communicate via a network 150, which may be a wide area network (WAN), local area network (LAN), personal area network (PAN), wireless network, cellular network, Ethernet network, Bluetooth network, universal serial bus (USB) network, the Internet, and/or any other suitable network. Although a single server 130 and configuration device 110 are shown for illustrative purposes, system 100 may generally include any number of servers, configuration devices, and client devices, each of which may be a physical computing system or a virtual computing system running in, e.g., a data center or cloud.

In one or more embodiments, server 130, configuration device 110, and client devices 102 interoperate to perform processing related to planning, conducting, analyzing, and managing structured interactions. These structured interactions include (but are not limited to) meetings, presentations, performances, events, interviews, question-and-answer sessions, and/or other types of interactions involving multiple users and/or specific types of content.

Each of client devices 102(1)-102(N) includes a client application 104(1)-104 (N) (each of which is referred to individually as client application 104) that is used to join or participate in one or more structured interactions. For example, a user of a given client device 102 could use the corresponding client application 104 to join a teleconference, video conference, and/or another type of remote structured interaction. During the remote structured interaction, instances of client application 104 on client devices 102 could transmit video and/or audio from some or all participants; allow some or all participants to send and receive chat messages, take notes, create "bookmarks" representing specific points in time in the structured interaction, and/or rate or review individual portions of the structured interaction; and/or allow some or all participants to view or share screens, virtual whiteboards, documents, and/or other types of content. One or more instances of client application 104 could also generate a recording or transcript of audio, video, chat messages, screen shares, and/or other content that was captured or shared during the event. In another example, a user of a given client device 102 could invoke client application 104 during a live (e.g., "in person") structured interaction. The user could use client device 102 to record video and/or audio of the structured interaction, take notes, send and receive messages with other users via other client applications 104 and/or client devices 102, take notes, create bookmarks, and/or generate other content related to the structured interaction.

Configuration device 110 provides functionality related to configuring or reviewing structured interactions. For example, a user could interact with a user interface on configuration device 110 to select a time and location for a meeting, interview, presentation, and/or another type of event; add the event to a calendar; and/or send invitations for the event to other users. The user could also interact with the user interface on configuration device 110 to develop a plan, "script," or other content related to the structure of the event or content to be covered or discussed in the event. After the event is complete, the user could use configuration device 110 to replay a recording or transcript of the event, add notes or observations to the recording or transcript, rate or score various portions of the event, and/or perform other actions related to reviewing the event or various participants in the event.

A server application 134 executing on server 130 processes data generated or collected by client devices 102 during structured interactions and/or data generated or collected by configuration device 110 during planning or review of the structured interactions. As described in further detail below, server application 134 can generate scripts for conducting the structured interactions based on user input or data received via configuration device 110, analyze recordings and/or transcripts of the structured interactions using machine learning and natural language processing (NLP) techniques, and/or produce other output that can be used to manage and/or improve structured interactions.

Figure 2:
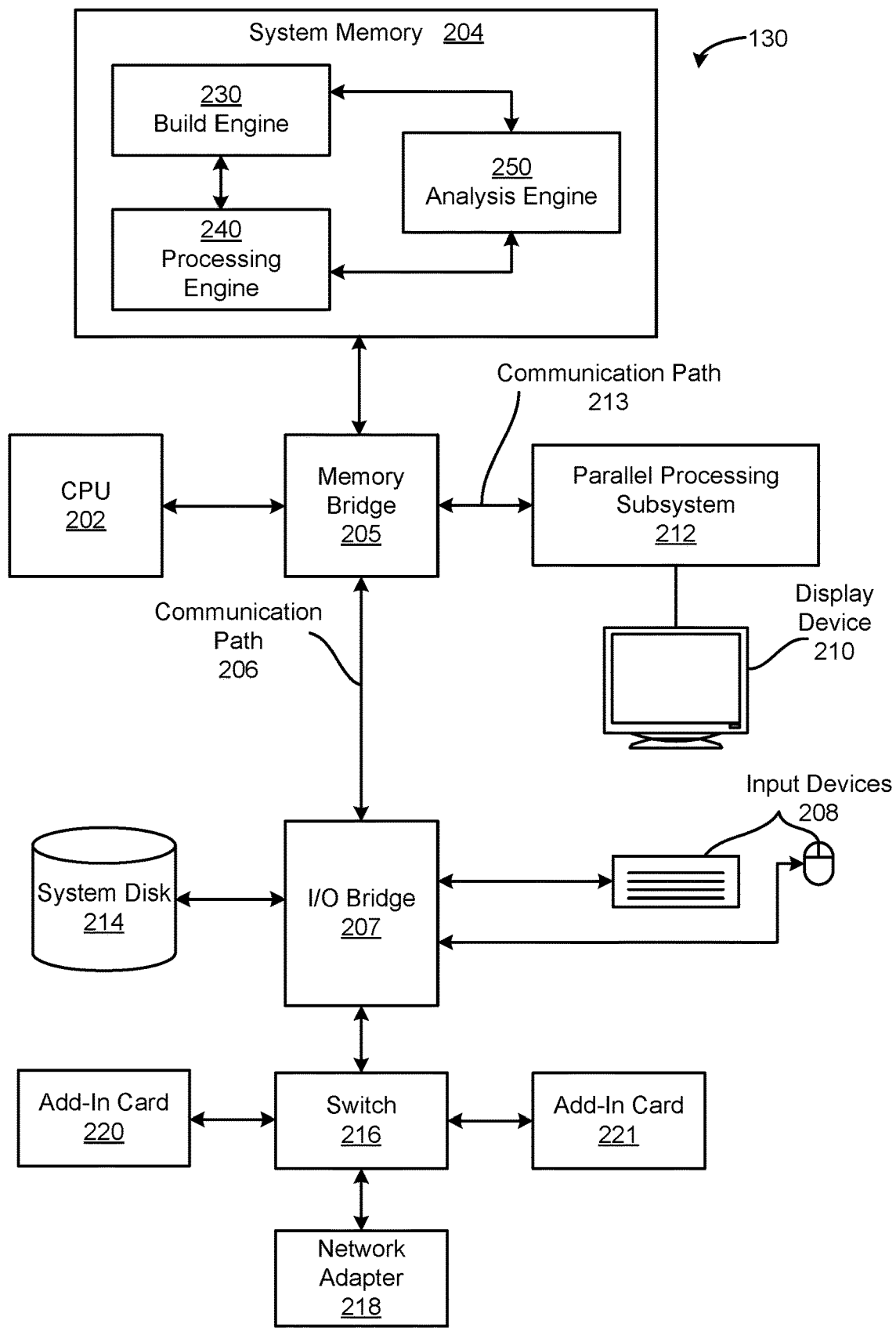
FIG. 2 is a more detailed illustration of the server of FIG. 1, according to various embodiments.

FIG. 2 is a more detailed illustration of server 130 of FIG. 1, according to various embodiments. It is noted that server 130 described herein is illustrative and that any other technically feasible configurations fall within the scope of the present invention. For example, the hardware and/or software components of server 130 may be implemented on client device 102 and/or configuration device 110. In another example, multiple instances of server 130 may execute on a set of nodes in a data center, cluster, or cloud computing environment to implement the functionality of server 130.

As shown, server 130 includes, without limitation, a central processing unit (CPU) 202 and a system memory 204 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In operation, I/O bridge 207 is configured to receive user input information from input devices 208, such as a keyboard or a mouse, and forward the input information to CPU 202 for processing via communication path 206 and memory bridge 205. Switch 216 is configured to provide connections between I/O bridge 207 and other components of server 130, such as a network adapter 218 and various add-in cards 220 and 221.

I/O bridge 207 is coupled to a system disk 214 that may be configured to store content, applications, and data for use by CPU 202 and parallel processing subsystem 212. As a general matter, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 207 as well.

In various embodiments, memory bridge 205 may be a Northbridge chip, and I/O bridge 207 may be a Southbridge chip. In addition, communication paths 206 and 213, as well as other communication paths within server 130, may be implemented using any technically suitable protocols, including, without limitation, AGP (Accelerated Graphics Port), HyperTransport, or any other bus or point-to-point communication protocol known in the art.

In some embodiments, parallel processing subsystem 212 includes a graphics subsystem that delivers pixels to a display device 210, which may be any conventional cathode ray tube, liquid crystal display, light-emitting diode display, or the like. In such embodiments, parallel processing subsystem 212 incorporates circuitry optimized for graphics and video processing, including, for example, video output circuitry. Such circuitry may be incorporated across one or more parallel processing units (PPUs) included within parallel processing subsystem 212. In other embodiments, parallel processing subsystem 212 incorporates circuitry optimized for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and compute processing operations. System memory 204 includes at least one device driver configured to manage the processing operations of the one or more PPUs within parallel processing subsystem 212.

In various embodiments, parallel processing subsystem 212 may be integrated with one or more of the other elements of FIG. 2 to form a single system. For example, parallel processing subsystem 212 may be integrated with CPU 202 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, system memory 204 could be connected to CPU 202 directly rather than through memory bridge 205, and other devices would communicate with system memory 204 via memory bridge 205 and CPU 202. In other alternative topologies, parallel processing subsystem 212 may be connected to I/O bridge 207 or directly to CPU 202, rather than to memory bridge 205. In still other embodiments, I/O bridge 207 and memory bridge 205 may be integrated into a single chip instead of existing as one or more discrete devices. Lastly, in certain embodiments, one or more components shown in FIG. 2 may not be present. For example, switch 216 could be eliminated, and network adapter 218 and add-in cards 220, 221 would connect directly to I/O bridge 207. In another example, display device 210 and/or input devices 208 may be omitted for some or all computers in a cluster.

In some embodiments, server 130 is configured to run a build engine 230, a processing engine 240, and an analysis engine 250 that reside in system memory 204. Build engine 230, processing engine 240, and analysis engine 250 may be stored in system disk 214 and/or other storage and loaded into system memory 204 when executed.

Build engine 230 assembles a script that specifies the topics, flow, timing, format, and/or other attributes related to the content or structure of a given structured interaction. For example, build engine 230 could assemble a script that includes a list of questions, cues, prompts, topics, or other representations of the content to be discussed or presented in the structured interaction. The script could also include an amount of time to be spent on each portion of content, the purpose of each portion of content, notes or suggestions related to each portion of content, and/or other information that can be used to conduct the structured interaction.

Processing engine 240 performs processing of data that is collected during the structured interaction. For example, processing engine 240 could generate a transcript of the structured interaction from a recording of the structured interaction. Processing engine 240 could also map portions of the transcript to notes, comments, messages, ratings, and/or other user input or actions from one or more users participating in the structured interaction.

Analysis engine 250 uses NLP and/or machine learning techniques to analyze the script, transcript, recording, user input, user actions, and/or other data generated by build engine 230 and/or processing engine 240 for a given structured interaction. Output generated by analysis engine 250 can be used to label interrogatories, answers, and/or other dialogue acts in the recording or transcript; match portions of the transcript and/or recording of the structured interaction to the relevant portions of the script; and/or determine topics, sentiments, skills, and/or other attributes related to portions of the transcript and/or recording. The operation of build engine 230, processing engine 240, and analysis engine 250 is described in further detail below.

Processing Structured Interactions

Figure 3:
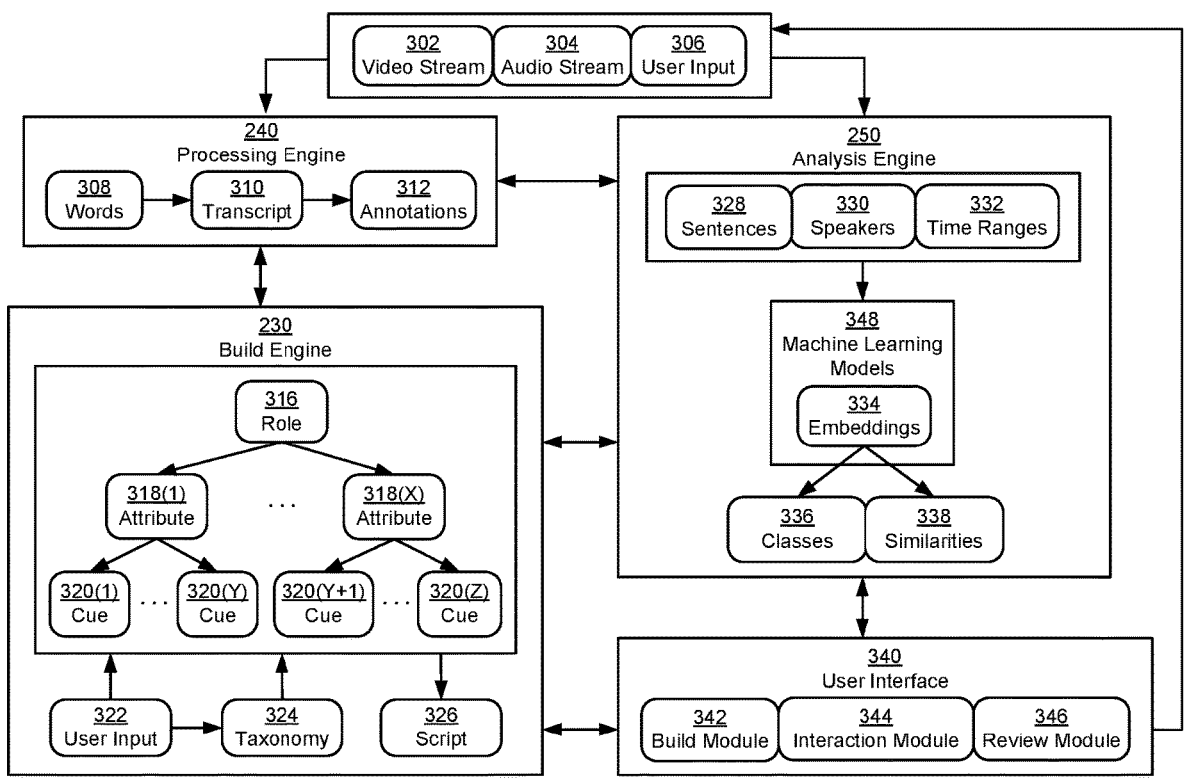
FIG. 3 is a more detailed illustration of the build engine, processing engine, and analysis engine of FIG. 2, according to various embodiments.

FIG. 3 is a more detailed illustration of build engine 230, processing engine 240, and analysis engine 250 of FIG. 2, according to various embodiments. As mentioned above, build engine 230, processing engine 240, and analysis engine 250 are configured to generate, process, and/or analyze data related to conducting, managing, or reviewing structured interactions.

In one or more embodiments, build engine 230, processing engine 240, and analysis engine 250 implement and/or operate in conjunction with a user interface 340. User interface 340 includes a graphical user interface (GUI), command line interface (CLI), web-based user interface, mobile user interface, voice user interface, touch user interface, natural language user interface, and/or another type of user interface with which one or more users interact. User interface 340 can be implemented by one or more components or devices, such as (but not limited to) client device 102, configuration device 110, and/or server 130. User interface 340 includes a build module 342, an interaction module 344, and a review module 346. Build module 342, interaction module 344, and review module 346 allow the user(s) to generate user input 306 and 322 that is provided to build engine 230, processing engine 240, and/or analysis engine 250 and/or receive output from build engine 230, processing engine 240, and analysis engine 250, as described in further detail below.

Build engine 230 generates a script 326 for conducting a structured interaction. Script 326 includes a sequence of lines, topics, suggestions, and/or other content that guides a user through a corresponding structured interaction. For example, build engine 230 could generate script 326 for conducting an interview with a candidate. As a result, script 326 could include a list of questions to ask the candidate during the interview.

In one or more embodiments, build engine 230 generates script 326 based on a taxonomy 324 associated with hiring, recruiting, staffing, employment, and/or interviews. As shown in FIG. 3, taxonomy 324 is used to organize a role 316, a set of attributes 318(1)-318(X) (each of which is referred to individually as attribute 318), and a set of cues 320(1)-320(Y) and 320(Y+1)-320(Z) (each of which is referred to individually as cue 320). Within taxonomy 324, a given role 316 is associated with a title (e.g., a job title), one or more aliases (i.e., alternative titles), a role family (e.g., a group of roles with similar requirements, skill sets, and functions), and/or a role type that indicates whether a given role 316 is a management role or an individual contributor role. Each attribute 318 in taxonomy 324 represents a skill, value, or another characteristic related to a candidate for a role. Each attribute 318 is associated with a name, a definition, and an attribute type (e.g., technical, human, management, culture/value, etc.). Each cue 320 in taxonomy 324 represents a question, prompt, topic, and/or another type of content that can be included in an interview. Each cue 320 is associated with a use (e.g., specific to a role or attribute or agnostic to individual roles or attributes), a cue type (e.g., behavioral, situational, standard, work sample, knowledge, opinion, etc.), one or more tips for assessing an answer to the cue, and/or one or more wildcards representing roles, skills, company names, or other types of fields that can be inserted into the cue to customize the cue to the interview.

Taxonomy 324 also includes mappings that represent relationships between each role 316 and a set of attributes 318 embodied by or related to that role 316. Taxonomy 324 further includes mappings that represent relationships between each attribute and a set of cues 320 that can be used to discuss or measure a candidate's proficiency in or possession of that attribute.

For example, a given role 316 in taxonomy 324 could be represented by a title of "account manager," additional aliases of "account executive" and "key account manager," a role family of "sales," and a role type of "individual contributor." The role could be associated with attribute names of "business acumen," "sales presentations," "sales closing," "customer relationships," "prospecting," "organizational skills," "product knowledge," "communication," and/or "critical/analytical thinking." The "product knowledge" attribute 318 could include a definition of "having a solid understanding of company products, services, or relevant technologies" and a skill type of "human." The "product knowledge" attribute 318 could also be mapped to a first cue 320 of "How would you ensure that customers get the most out of our company's platform/services?" The first cue 320 includes a cue type of "situational" and tips of "candidate shows they can understand and articulate the client's vision and goals," "candidate discusses ensuring the product/service fits the customer's needs," "candidate discusses tailoring services to client's needs based on knowledge of offering," "candidate suggests asking questions to identify and understand the client's needs," and/or "candidate suggests passing feedback to the product team and managing client expectations." The "product knowledge" attribute 318 could further be mapped to a second cue 320 of "Insert questions that test the candidate's knowledge of the core products/services your business offers, as required for the role you are hiring for." The second cue 320 includes a cue type of "standard" and tips of "open up the dialogue and assess responses," "determine what the candidate needs to reference to convey comprehensive knowledge," and "determine how to distinguish between average and high-quality candidates." As a result, the first cue 320 is a specific question to be presented to an interviewee, and the second cue 320 represents a prompt for an interviewer to come up with a question that is tailored to a particular role or company.

In one or more embodiments, build engine 230 combines taxonomy 324 with user input 322 received from build module 342 in user interface 340 to generate script 326. Build engine 230 also generates output that is related to script 326 for presentation by build module 342.

First, build module 342 includes a search field, drop-down menu, and/or another user-interface element that allows a user to search for, browse, or otherwise specify a title, function, description, and/or another representation of a position to be filled. Build module 342 and/or build engine 230 can match user input 322 received via this user-interface element to a corresponding title, alias, description, and/or another field associated with a corresponding role 316 in taxonomy 324. As the user enters or selects text via the user-interface element, build module 342 and/or build engine 230 can surface titles, aliases, and/or other fields related to roles in taxonomy 324 that are similar to the text as hints or suggestions within a typeahead field. When user input 322 fails to exactly match any fields associated with roles in taxonomy 324 (e.g., if user input 322 corresponds to a title that is not in taxonomy 324), build module 342 and/or build engine 230 can match user input 322 to a given role 316 in taxonomy 324 based on semantic similarity, role type, an overlap between skills associated with the role represented by user input 322 (e.g., a set of skills matched to the role from other records or datasets) and skills associated with role 316 in taxonomy 324, and/or other criteria.

After role 316 is selected based on user input 322, build module 342 outputs additional user-interface elements that allow the user to select a set of skills, values, and/or other attributes 318 that are relevant to role 316. For example, build module 342 could output a "cloud" of skills, values, or other attributes 318 that are potentially related to the selected role 316. The cloud could be populated with attributes 318 that are mapped to the selected role 316 within taxonomy 324, attributes 318 that are mapped to roles in taxonomy 324 that are similar to the selected role 316, attributes 318 that are similar to those that are mapped to the selected role 316, co-occurrences of the selected role 316 and attributes 318 (e.g., in job postings or other public records), and/or role-agnostic attributes 318 that are occur within the role family associated with the selected role 316. The user could interact with the cloud to select one or more attributes 318 as skills, values, or characteristics to be assessed for the selected role 316.

Second, build module 342 and/or build engine 230 are configured to allow the user to define interviews for the selected role 316. For example, build module 342 could output boxes, drop-down menus, text fields, and/or other user-interface elements that allow the user to specify the number of interviews and/or interview rounds to be conducted, the length of each interview, the type of each interview (e.g., discovery, technical interview, cultural interview, manager one-on-one, case study, work sample, etc.), the number and/or identity of the interviewers for each interview, specific attributes 318 to be assessed within each interview, and/or other parameters related to the interviews. If these parameters are not specified by the user, build module 342 and/or build engine 230 could use "default"

values for the parameters (e.g., three interview rounds composed of a phone interview, a technical interview, and a cultural interview) to define the interviews.

After one or more interviews are defined for a given role 316, build engine 230 generates script 326 for each interview based on the number and types of interviews, attributes 318 selected for each interview and/or role 316, and cues 320 that measure or assess the selected attributes 318. First, build engine 230 generates or selects a "template" for each script 326 that is tailored to the corresponding type of interview. For example, build engine 230 could determine the type of interview to be performed based on explicit user input 322 (e.g., a user indicating that the interview is a technical interview, cultural interview, case study, etc.) and/or a list of attributes 318 to be assessed in the interview (e.g., an interview that is predominantly used to assess attributes 318 representing values is likely to be a cultural interview). Build engine 230 could select a template for script 326 that matches the type of interview.

In one or more embodiments, templates for script 326 are divided into multiple portions. Each portion of content spans an interval of time (e.g., a certain number of minutes) within an interview and is designated for a certain purpose.

An example template that is used with script 326 for a "discovery" interview with a candidate could include the following portions:

|  | Time | Assessing/Tactical Purpose |
|---|---|---|
| Part 1: Rapport Building | 2 minutes | Making candidate feel comfortable, be open and honest, personable |
| Part 2: Why this role? | 10 minutes | Initial motivation assessment |
| Part 3: Do you understand the role? | 5 minutes | Are the expectations of the role aligned between the interviewer and interviewee? |
| Part 4: Quick qualifications assessments (e.g., software knowledge if crucial to job) | 10 minutes | Does the person have the necessary experience and qualifications to do the job? |
| Part 5: Candidate questions | 5 minutes | See if the candidate has done research/shows initiative/what do they want to know? |

An example template that is used with script 326 for a technical interview with a candidate could include the following portions:

|  | Time | Assessing/Tactical Purpose |
|---|---|---|
| Part 1: Rapport Building | 2 minutes | Making candidate feel comfortable, be open and honest, personable |
| Part 2: Job Motivation | 8 minutes | Motivation, personality, soft skills |
| Part 3: Hard Skills | 25 minutes | Assess 3 hard skills |
| Part 4: Tricky Question/Concern Probing | 5 minutes | Mistake they made and how they fixed it; How does the candidate react/deal with adversity? |
| Part 5: Candidate Questions | 5 minutes | See if the candidate has done research/shows initiative/what do they want to know? |

Both example templates begin with a portion that is used to build rapport with a candidate and conclude with a portion that allows the candidate to ask questions of the interview team. The template for the discovery interview includes additional portions that are used to assess the initial motivation, role expectations, and qualifications of the candidate. The template for the technical interview includes additional portions that are used to assess the candidate's motivation, personality, soft skills, hard skills, and ability to handle adversity or mistakes.

Next, build engine 230 adds attributes 318 and/or cues 320 to individual portions of script 326 based on the template. For example, build engine 230 could assign two attributes 318 representing values or soft skills to the "Job Motivation" portion of script 326 for a technical interview and assign three attributes 318 representing hard skills to the "Hard Skills" portion of script 326 for the technical interview. Build engine 230 could then select one or more cues 320 that are used to assess each attribute 318 and add the selected cue(s) to the corresponding portion of script 326. In another example, build engine 230 could identify 15 "slots" for cues 320 across two interviews of a candidate for a given role 316. Build engine 230 could also determine that five attributes 318 were selected for role 316. Build engine 230 could then "pack" cues 320 that are used to assess the five attributes 318 into the 15 slots so that each of the five attributes 318 is assessed using at least a minimum number of questions, attributes 318 that are deemed to be more "important" by the user or taxonomy 324 are assessed using more questions than attributes 318 that are deemed to be less "important" by the user or taxonomy 324, and/or any other constraints related to the assessment of attributes 318 across the two interviews are met.

After build engine 230 creates script 326 for a given interview, build module 342 outputs user-interface elements that allow the user to review and/or customize script 326. For example, build module 342 could display an overview of the interview that includes the role associated with the interview, the length of the interview, the number of cues 320 in script 326, interviewers participating in the interview, and/or other general information related to the interview. Build module 342 could also display script 326, including the portions into which the interview is divided, a name or purpose of each portion, the duration of each portion, one or more attributes 318 to be assessed within the portion, and/or one or more cues 320 to be used within the portion. Build module 342 could further output text boxes, buttons, drop-down menus, and/or other user-interface elements that allow the user to view, edit, reorder, add, delete, and/or otherwise customize attributes 318 and/or cues 320 in script 326.

The user can also save script 326 for subsequent use with the same role 316 and/or similar roles. For example, the user could interact with build module 342 to share script 326 with other members of a hiring team, group, division, and/or company to which the user belongs. The user could also, or instead, interact with build module 342 to publicly share the script in an anonymous or non-anonymous manner.

In one or more embodiments, build engine 230 updates taxonomy 324 based on user input 322 received through build module 342. First, build engine 230 can add roles, attributes 318, cues 320, and/or other elements to taxonomy 324 as these elements are created via user input 322 provided to build module 342. Second, build engine 230 can update mappings across roles, attributes 318, and/or cues 320 within taxonomy 324 based on user input 322. For example, build engine 230 could associate mappings in taxonomy 324 with numeric weights. Each weight could represent the "strength" of a relationship between a role and an attribute, an attribute and a cue, a role and a cue, and/or any other two elements mapped to one another within taxonomy 324. Build engine 230 could increase the weight when user input 322 indicates that that the two elements are linked or related (e.g., indicating that a specific cue 320 is used to assess a specific attribute 318, indicating that a specific cue 320 is used in an interview for a given role 316, selecting a specific attribute 318 for a given role 316, etc.). Conversely, build engine 230 could decrease the weight when user input 322 indicates that the two elements are not linked or related (e.g., modifying or deleting a cue that is used to assess a specific attribute, excluding a cue from script 326 for a given role 316, not selecting a specific attribute 318 for a given role 316, etc.). Thus, the accuracy and comprehensiveness of taxonomy 324 improves over time as build module 342 and build engine 230 are used to create scripts for various types of roles, attributes 318, and/or cues 320.

After script 326 is generated by build engine 230, script 326 can be used to conduct one or more structured interactions. For example, script 326 can be used by a hiring manager, interview team, instructor, and/or other users to conduct an interview, skill assessment, screening, and/or another type of interaction that is driven by cues 320 in script 326.

In some embodiments, interaction module 344 in user interface 340 incorporates script 326 into user-interface elements that are used to guide or conduct a structured interaction. For example, interaction module 344 could be provided by client application 104 executing on a computer system, mobile device, and/or another type of client device 102. At the start of an interview, an interviewer could launch client application 104 and use client application 104 to record audio and/or video of the interview. During the interview, interaction module 344 could display and/or otherwise output a sequence of cues 320 in a corresponding script to the interviewer. After a portion of the interview corresponding to a given cue is complete, the interviewer could provide user input 306 to interaction module 344 to advance to the next cue in the script. The interviewer could also interact with user-interface elements provided by interaction module 344 to send and receive messages with other interviewers, take notes, generate a "bookmark" of a time in the interview, rate a portion of the interview (e.g., provide a thumbs up, thumbs down, numeric rating, and/or other feedback related to a cue or a candidate's answer to a cue), and/or generate additional user input 306. Each piece of user input 306 could additionally be timestamped by interaction module 344 for subsequent processing and use.

Processing engine 240 processes data collected by interaction module 344 during a structured interaction. As shown in FIG. 3, processing engine 240 generates a transcript 310 of the structured interaction from words 308 detected in a recording of the structured interaction. Transcript 310 can be generated in a real-time or near-real-time basis during the structured interaction and/or in an offline basis after the structured interaction.

In some embodiments, to generate transcript 310, processing engine 240 uses a speech recognition technique to detect words 308 and/or other units of speech (e.g., morphemes, phrases, n-grams, etc.) in an audio stream 304 and/or a video stream 302 (e.g., a live stream, recording, etc.) of an interview. Processing engine 240 could also identify times or periods during which individual speakers 330 are detected in audio stream 304 and/or video stream 302 (e.g., as speaker names and/or labels that are outputted by a teleconferencing platform during or after the structured interaction and/or included in metadata associated with audio stream 304 and/or video stream 302). Processing engine 240 could calculate the total amount of time associated with each speaker and determine that the speaker with the most speaking time is a candidate. Processing engine 240 could also group all remaining speakers under the same speaking entity represented by "interview team."

Continuing with the above example, after speakers 330 are assigned to "candidate" and "interview team," processing engine 240 could combine consecutive words from the same speaker into an utterance for the speaker. Processing engine 240 could then divide each utterance into a sequence of consecutive sentences 328, where each sentence is labeled with an identifier for the corresponding speaker and timestamps of start and end times of individual words 308 (or other units of speech) in the sentence. Finally, processing engine 240 could store each sentence as a separate row in transcript 310, aggregate the start and end times of individual words 308 (or other units of speech) in the sentence into a start time and end time for the sentence, and generate a word count for the sentence. In other words, processing engine 240 can store and/or represent transcript 310 as a sequence of sentences 328 that are stored in different rows of a database (or another type of data store) and labeled with speakers 330 and time ranges 332 (i.e., start and end times). Processing engine 240 can also, or instead, generate a word-level transcript 310 that stores words 308 in different rows and/or records of a database or data store.

Processing engine 240 also generates annotations 312 associated with transcript 310. For example, processing engine 240 could match timestamps of bookmarks, notes, messages, ratings, and/or other user input 306 generated during an interview to individual words 308 and/or sentences 328 in transcript 310, segments of video stream 302 and/or audio stream 304, and/or individual cues 320 or portions of script 326.

Analysis engine 250 uses one or more machine learning models 348 to generate embeddings 334 related to sentences 328 and/or other parts of transcript 310. As described in further detail below with respect to FIGS. 4A-4C, analysis engine 250 also uses embeddings 334 and/or other output of machine learning models 348 to predict one or more classes 336 associated with the content in transcript 310 and/or determine similarities 338 across portions of transcript 310, components of script 326, and/or portions of taxonomy 324.

Figure 4A:
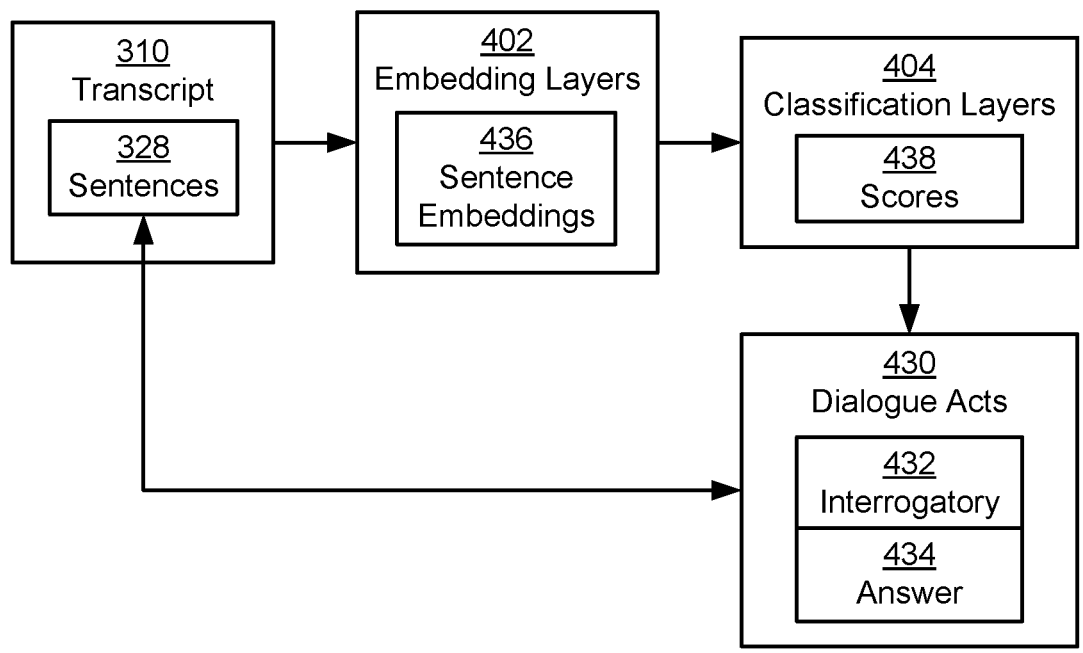
FIG. 4A illustrates the example processing of a transcript by the analysis engine of FIG. 2, according to various embodiments.

FIG. 4A illustrates the example processing of transcript 310 by analysis engine 250 of FIG. 2, according to various embodiments. More specifically, FIG. 4A shows the determination of dialogue acts 430 associated with sentences 328 in transcript 310.

As shown in FIG. 4A, sentences 328 in transcript 310 are inputted into a series of embedding layers 402 to generate a corresponding set of sentence embeddings 436. Each of sentence embeddings 436 includes a fixed-length vector representation of the words and/or a sequence of words in a corresponding sentence.

Embedding layers 402 can be implemented using a variety of embedding models and/or techniques. For example, embedding layers 402 could be provided by a Bidirectional Encoder Representations from Transformers (BERT) model that is pretrained using a Robustly Optimized BERT Pretraining approach (ROBERTa). Each sentence inputted into the model could begin with a classification token, end with a separator token, and include a sequence of words in the sentence between the classification token and separator token. An embedding of the inputted sentence could then be obtained as a vector representing the classification token, the output of a hidden layer produced by the model from the inputted sentence, and/or an aggregation of vectors produced by the model from individual tokens in the sentence.

One or more embedding layers 402 could also, or instead, be used to generate word embeddings of individual words in each sentence. A bidirectional gated recurrent unit (GRU) could be applied to the word embeddings to generate forward and backward outputs for each word embedding. The forward and backward outputs associated with word embeddings for all words in the sentence could then be concatenated or otherwise combined into an initial sentence embedding for the sentence. A context-aware self-attention mechanism could then be applied to the initial sentence embedding and a hidden state representing one or more previous sentences in transcript 310 to produce an updated sentence embedding for the sentence.

Next, one or more classification layers 404 are applied to sentence embeddings 436 to generate scores 438 associated with different types of dialogue acts 430. As with embedding layers 402, classification layers 404 can be implemented using a variety of models and/or techniques. For example, classification layers 404 could include a linear layer, softmax layer, and/or another type of neural network layer that converts a sentence embedding representing a sentence into a set of scores 438 that sum to 1. Each of scores 438 could represent the predicted probability that the sentence is an interrogatory 432 (e.g., a question, cue, and/or another prompt for an answer), an answer 434 (e.g., a response to a prompt), or another type of dialogue act 430.

In another example, classification layers 404 could include a bidirectional GRU layer that encodes sentences across transcript 310 and/or within a portion of transcript 310 (e.g., a subset of transcript 310 that includes sentences related to a specific cue 320). Classification layers 404 could also include a conditional random field (CRF) layer that is applied to hidden states generated by the bidirectional GRU layer from sentence embeddings 436. The CRF layer considers correlations between labels for sentences 328 and jointly decodes the optimal sequence of scores 438 representing dialogue acts 430 for a sequence of sentences 328 instead of determining scores 438 individually for each sentence.

Analysis engine 250 generates mappings of sentences 328 in transcript 310 to the corresponding predicted dialogue acts 430 based on scores 438 generated by classification layers 404 from sentence embeddings 436. For example, analysis engine 250 could determine a type of dialogue act 430 (e.g., interrogatory 432, answer 434, or other) associated with the highest score outputted by classification layers 404 for a sentence and verify that the highest score meets a threshold. Analysis engine 250 could then update a database row in which the sentence is stored with the determined type of dialogue act 430.

Figure 4B:
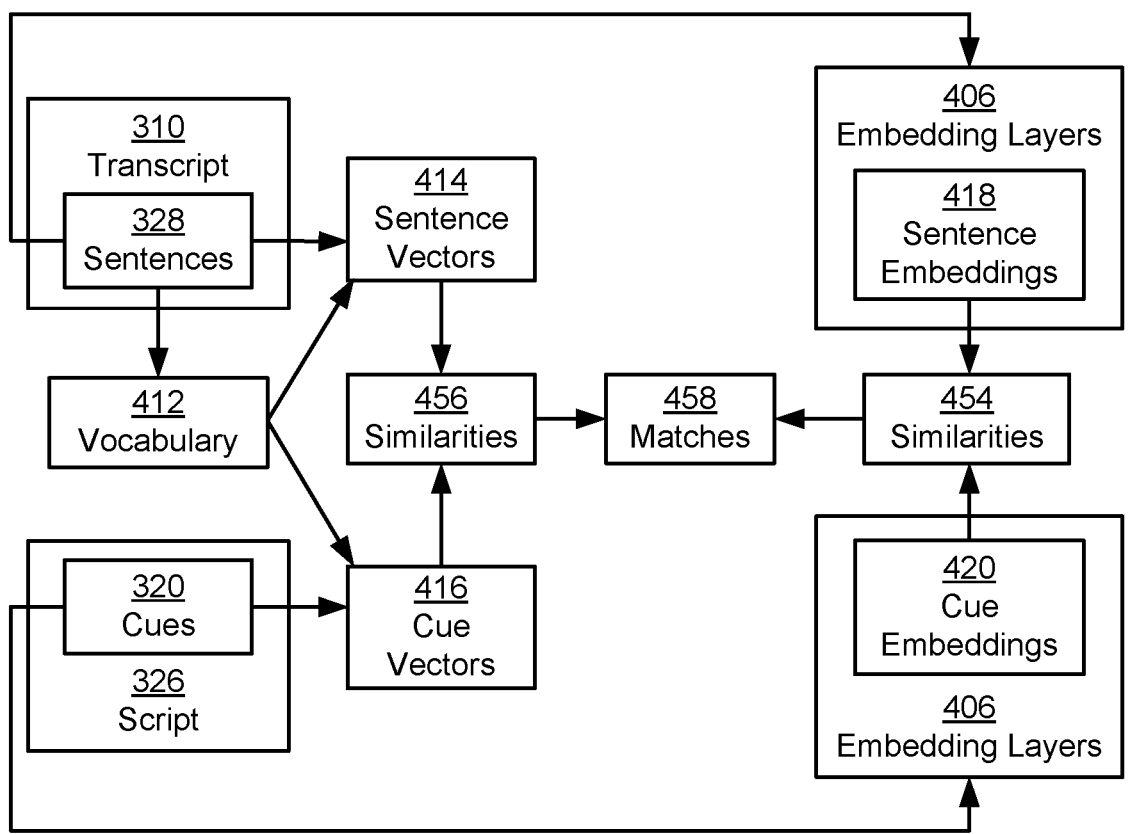
FIG. 4B illustrates the example processing of a transcript by the analysis engine of FIG. 2, according to various embodiments.

FIG. 4B illustrates the example processing of transcript 310 by analysis engine 250 of FIG. 2, according to various embodiments. More specifically, FIG. 4B shows the generation of matches 458 between sentences 328 in transcript 310 and cues 320 in script 326. In some embodiments, matches 458 denote semantic similarity between sentences 328 and cues 320. For example, matches 458 could be used to identify sentences 328 corresponding to cues 320 within transcript 310, identify answers to cues 320 within transcript 310, verify that all cues 320 in script 326 can be found in transcript 310, and/or identify one or more cues 320 that are included in script 326 but missing from transcript 310.

In some embodiments, analysis engine 250 selects a subset of sentences 328 in transcript 310 as candidates for matches 458 with cues 320 in script 326. For example, analysis engine 250 could limit sentences 328 under consideration for matches 458 to sentences 328 that are labeled with speakers that are responsible for delivering cues 320 in script 326 (e.g., members of an interview team that ask questions corresponding to cues 320). When sentences 328 are labeled with dialogue acts 430 (e.g., based on scores 438 generated by classification layers 404), analysis engine 250 could further limit potential matches 458 to sentences 328 that correspond to interrogatory 432 dialogue acts 430. This filtering of sentences 328 improves the accuracy of matches 458 (e.g., by preventing non-interrogatory sentences 328 from being matched to cues 320) and reduces computational complexity and resource overhead associated with generating matches 458 between cues 320 and a larger set of sentences 328 in transcript 310.

As shown in FIG. 4B, analysis engine 250 uses a vocabulary 412 associated with transcript 310 to generate sentence vectors 414 representing sentences 328 in transcript 310 and cue vectors 416 representing cues 320 in script 326. For example, vocabulary 412 could include all words in transcript 310 and/or all words detected in a recording of a structured interaction for which transcript 310 is generated. Analysis engine 250 could also generate sentence vectors 414 and cue vectors 416 as term frequency-inverse document frequency (TF-IDF) vectors. Each TF-IDF vector includes a length that is equal to the number of words in vocabulary 412. Each element in the TF-IDF vector stores the TF-IDF of a corresponding word, as calculated for a sentence or cue represented by the TF-IDF vector. When the TF-IDF vector represents a sentence in transcript 310, the IDF of a given word in the sentence could be calculated based on the number of sentences 328 under consideration for matches 458 and/or a sum of the number of sentences 328 under consideration for matches 458 and the number of cues 320 in script 326. When the TF-IDF vector represents a cue in script 326, the IDF of a given word could be calculated based on the number of cues 320 in script 326 and/or a sum of the number of sentences 328 under consideration for matches 458 and the number of cues 320 in script 326.

Analysis engine 250 computes similarities 456 between individual sentence vectors 414 and individual cue vectors 416. For example, analysis engine 250 generates similarities 456 as dot products, cosine similarities, Euclidean distances, and/or other measures of vector similarity or distance between all possible pairs of sentence vectors 414 and cue vectors 416.

Analysis engine 250 also applies a set of embedding layers 406 to sentences 328 to generate a corresponding set of sentence embeddings 418. Analysis engine 250 applies the same embedding layers 406 to cues 320 to generate a corresponding set of cue embeddings 420. Analysis engine 250 then calculates a set of similarities 454 between each of sentence embeddings 418 and each of cue embeddings 420.

For example, embedding layers 406 could be provided by an encoder in a BERT, dense passage retrieval (DPR), and/or another type of machine learning model. Within the machine learning model, embedding layers 406 could convert a sequence of words in an input sentence or cue into a fixed-length vector representation in a lower-dimensional latent space. After embedding layers 406 are used to generate sentence embeddings 418 for all sentences 328 under consideration for matches 458 and cue embeddings 420 for all cues 320 in script 326, analysis engine 250 could compute similarities 454 as dot products, cosine similarities, Euclidean distances, and/or other measures of vector similarity or distance between individual sentence embeddings 418 and individual cue embeddings 420.

After similarities 456 between all possible pairs of sentence vectors 414 and cue vectors 416 and similarities 454 between all possible pairs of sentence embeddings 418 and cue embeddings 420 have been computed, analysis engine 250 generates matches 458 based on similarities 454 and 456. For example, analysis engine 250 could calculate an overall similarity between each sentence in transcript 310 and each cue in script 326 based on a sum, weighted sum, average, and/or another aggregation of a first similarity (e.g., in similarities 456) between a sentence vector for the sentence and a cue vector for the cue and a second similarity (e.g., in similarities 454) between a sentence embedding for the sentence and a cue embedding for the cue. Next, analysis engine 250 could generate matches 458 between pairs of cues 320 and sentences 328 that have the highest overall similarities. Analysis engine 250 could also, or instead, use a bipartite matching technique to generate matches 458 so that the sum of the overall similarities between pairs of sentences 328 and cues 320 selected for inclusion in matches 458 is maximized. Prior to establishing a match between a cue and a sentence, analysis engine 250 could verify that the overall similarity between the cue and sentence meets or exceeds a threshold. As a result, a cue may fail to be matched to a sentence if the overall similarities between the cue and all sentences 328 under consideration for matches 458 all fail to meet the threshold.

Figure 4C:
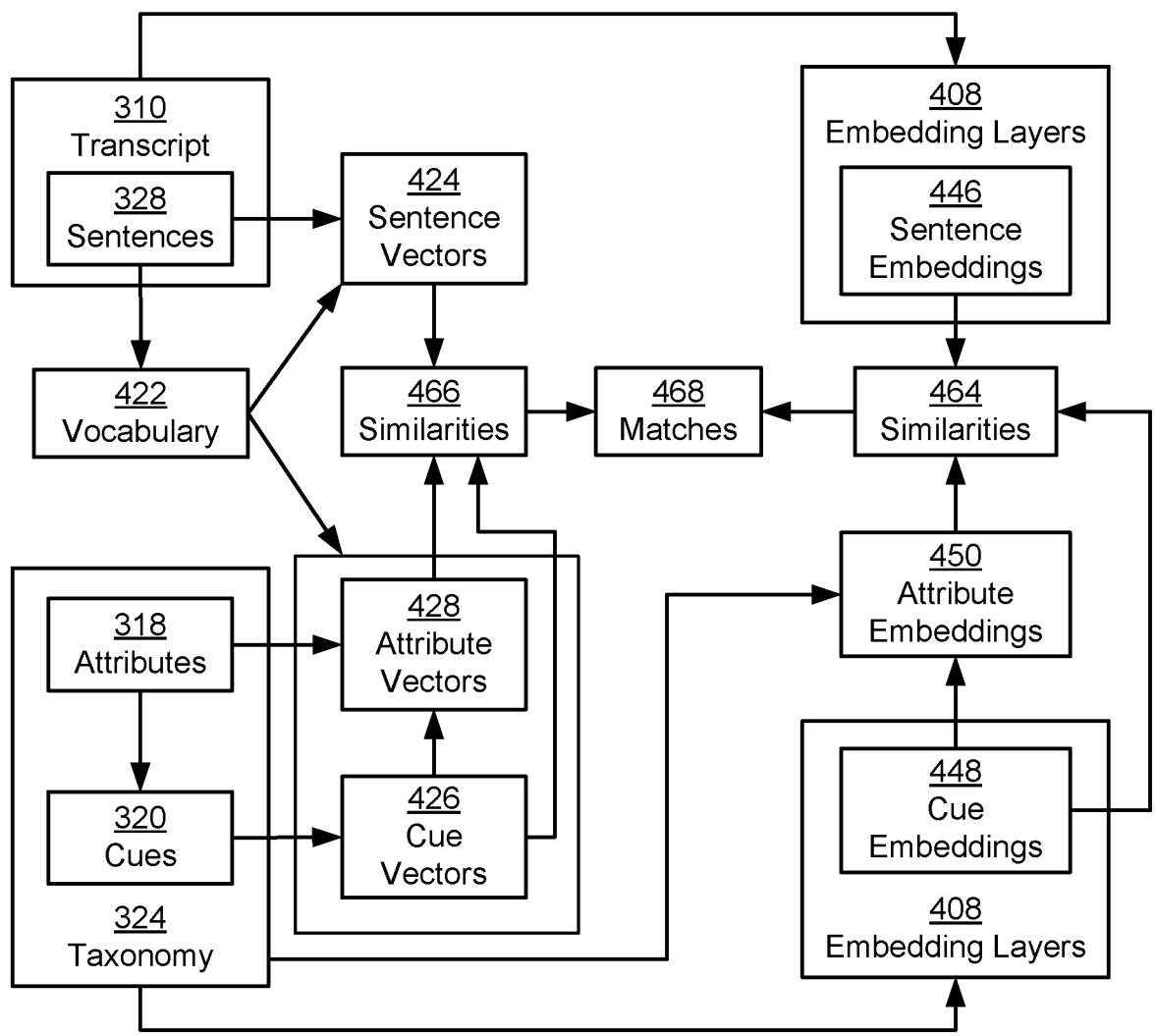
FIG. 4C illustrates the example processing of a transcript by the analysis engine of FIG. 2, according to various embodiments.

FIG. 4C illustrates the example processing of transcript 310 by analysis engine 250 of FIG. 2, according to various embodiments. More specifically, FIG. 4C shows the generation of matches 468 between sentences 328 in transcript 310 and attributes 318 in taxonomy 324. In some embodiments, matches 468 represent predictions of attributes 318 that are related to sentences 328. For example, matches 468 could be used to determine one or more skills that are assessed in an interrogatory sentence, assess the extent to which the skill(s) are measured in an answer to the interrogatory sentence, verify that all attributes 318 associated with cues 320 in script 326 can be found in transcript 310, and/or identify one or more attributes 318 that are associated with cues 320 in script 326 but missing from transcript 310.

As with matches 458 in FIG. 4B, analysis engine 250 can limit sentences 328 that are under consideration for matches 468 in FIG. 4C. For example, analysis engine 250 could limit matches 468 to sentences 328 labeled with speakers that are responsible for delivering cues 320 in script 326 (e.g., members of an interview team that ask questions corresponding to cues 320). When sentences 328 are labeled with dialogue acts 430 (e.g., based on scores 438 generated by classification layers 404), analysis engine 250 could further limit potential matches 468 to sentences 328 that correspond to interrogatory 432 dialogue acts 430.

As shown in FIG. 4C, analysis engine 250 uses a vocabulary 422 associated with sentences 328 in transcript 310 to generate sentence vectors 424 representing sentences 328 in transcript 310 and cue vectors 426 representing cues 320 in script 326. For example, vocabulary 422 could include all words in transcript 310 and/or all words detected in a recording of a structured interaction for which transcript 310 is generated. Given vocabulary 422, analysis engine 250 could generate sentence vectors 424 and cue vectors 426 as term frequency-inverse document frequency (TF-IDF) vectors. Each TF-IDF vector includes a length that is equal to the number of words in vocabulary 422. Each element in the TF-IDF vector stores the TF-IDF of a corresponding word, as calculated for a sentence or cue represented by the TF-IDF vector. When the TF-IDF vector represents a sentence in transcript 310, the IDF of a given word in the sentence could be calculated based on the number of sentences 328 under consideration for matches 458 and/or a sum of the number of sentences 328 under consideration for matches 458 and the number of cues 320 in taxonomy 324. When the TF-IDF vector represents a cue in script 326, the IDF of a given word could be calculated based on the number of cues 320 in taxonomy 324 and/or a sum of the number of sentences 328 under consideration for matches 458 and the number of cues 320 in taxonomy 324.

Analysis engine 250 generates attribute vectors 428 representing attributes 318 in taxonomy 324 based on cue vectors 426 representing cues 320 that are mapped to attributes 318 in taxonomy 324. For example, analysis engine 250 could calculate an attribute vector for a given attribute in taxonomy 324 as an average and/or another aggregation of cue vectors 426 for a set of cues 320 that are mapped to the attribute within taxonomy 324.

Analysis engine 250 also applies a set of embedding layers 408 to sentences 328 to generate a corresponding set of sentence embeddings 446. Analysis engine 250 applies the same embedding layers 408 to cues 320 to generate a corresponding set of cue embeddings 448. For example, embedding layers 408 could be provided by an encoder in a BERT, dense passage retrieval (DPR), and/or another type of machine learning model. Within the machine learning model, embedding layers 408 could convert a sequence of words in an input sentence or cue into a fixed-length vector representation in a lower-dimensional latent space.

Analysis engine 250 additionally generates attribute embeddings 450 representing attributes 318 in taxonomy 324 based on cue embeddings 448 representing cues 320 that are mapped to attributes in taxonomy 324. For example, analysis engine 250 could calculate an attribute embedding for a given attribute in taxonomy 324 as an average and/or another aggregation of cue embeddings 448 for a set of cues 320 that are mapped to the attribute within taxonomy 324.

Analysis engine 250 computes vector-based similarities 466 between sentence vectors 424 representing sentences 328 and attribute vectors 428 representing attributes 318. Analysis engine 250 also computes embedding-based similarities 464 between sentence embeddings 446 representing sentences 328 and attribute embeddings 450 representing attributes 318. For example, analysis engine 250 could compute similarities 464 and 466 as dot products, cosine similarities, Euclidean distances, and/or other measures of vector similarity or distance. Similarities 464 could be computed between all possible pairs of sentence embeddings 446 and attribute embeddings 450, and similarities 466 could be computed between all possible pairs of sentence vectors 424 and attribute vectors 428.

In lieu of or in addition to similarities 466 between sentence vectors 424 and attribute vectors 428, analysis engine 250 can compute similarities 466 between sentence vectors 424 and cue vectors 426 for sets of cues 320 that are mapped to individual attributes 318 in taxonomy 324. Analysis engine 250 can then aggregate (e.g., via a sum, weighted sum, average, etc.) similarities 466 between each sentence vector and each set of cue vectors 426 for cues 320 mapped to the same attribute in taxonomy 324 into vector-based similarities 466 between the sentence represented by the sentence vector and all attributes 318. Along the same lines, analysis engine 250 can compute similarities 464 between sentence embeddings 446 and cue embeddings 448 for sets of cues 320 that are mapped to individual attributes 318 in taxonomy 324. Analysis engine 250 can then aggregate (e.g., via a sum, weighted sum, average, etc.) similarities 464 between each sentence embedding and each set of cue embeddings 448 for cues 320 mapped to the same attribute in taxonomy 324 into embedding-based similarities 464 between the sentence represented by the sentence vector and all attributes 318.

In other words, analysis engine 250 is configured to use one or more techniques to determine semantic similarity between a given sentence in transcript 310 and a given attribute in taxonomy 324. One technique involves initially aggregating cue vectors 426 and cue embeddings 448 for cues 320 mapped to different attributes 318 in taxonomy 324 into attribute vectors 428 and attribute embeddings 450, respectively, for attributes 318. This technique then computes vector-based similarities 466 between sentence vectors 424 for sentences 328 in transcript 310 and attribute vectors 428 for different attributes 318 in taxonomy 324 and computes embedding-based similarities 464 between sentence embeddings 446 and attribute embeddings 450 for these attributes 318. Another technique involves initially computing similarities 466 between sentence vectors 424 for sentences 328 in transcript 310 and cue vectors 426 for sets of cues 320 mapped to individual attributes 318 in taxonomy 324. This technique also computes similarities 464 between sentence embeddings 446 for sentences 328 in transcript 310 and cue embeddings 448 for the same sets of cues 320. This technique then aggregates similarities 466 into vector-based similarities 466 between all possible pairs of sentence vectors 424 and all attributes 318, and also aggregates similarities 464 into embedding-based similarities 464 between all possible pairs of sentence embeddings 446 and all attributes 318.

After similarities 466 and similarities 464 have been computed, analysis engine 250 generates matches 468 based on similarities 464 and 466. For example, analysis engine 250 could calculate an overall similarity between each sentence in transcript 310 and each attribute in taxonomy 324 as a sum, weighted sum, average, and/or another aggregation of a first vector-based similarity (e.g., in similarities 466) between a sentence and an attribute and a second embedding-based similarity (e.g., in similarities 464) between the sentence and the attribute. Analysis engine 250 could then generate one or more matches 468 between each of sentences 328 and one or more attributes 318 with which the sentence has greater than a threshold overall similarity. Analysis engine 250 could also, or instead, generate a ranking of attributes 318 for each sentence. Within the ranking, attributes 318 could be ordered by descending overall similarity with the sentence.

While FIG. 4C illustrates the generation of matches 468 between sentences 328 in transcript 310 and attributes 318 in taxonomy 324, it will be appreciated that other types of text or content can be matched to attributes 318. For example, similarities 464 and 466 between attributes 318 and a new cue in taxonomy 324 and/or script 326 could be used to determine one or more attributes 318 that are likely to be related to the new cue and/or generate mappings between the new cue and the attribute(s) within taxonomy 324.

Returning to the discussion of FIG. 3, analysis engine 250 generates additional annotations 312 related to transcript 310, taxonomy 324, and/or script 326 based on embeddings 334, classes 336, similarities 338, and/or other output from machine learning models 348. For example, analysis engine 250 could label sentences 328 in transcript 310 with interrogatory 432, answer 434, and/or other types of dialogue acts 430. In another example, analysis engine 250 could update transcript 310, generate markers that link to transcript 310, and/or otherwise indicate matches 458 between sentences 328 and cues 320 in script 326. In a third example, analysis engine 250 could update transcript 310, generate markers that link to transcript 310, and/or otherwise indicate matches 468 between sentences 328 and attributes 318 in taxonomy 324. In a fourth example, analysis engine 250 could update mappings in taxonomy 324 with matches 468 between cues 320 and attributes 318.

In some embodiments, review module 346 in user interface 340 includes user-interface elements that output transcript 310 and annotations 312 to one or more users involved in conducting or reviewing a corresponding structured interaction. For example, review module 346 could be provided by an application executing on a computer system, mobile device, and/or another type of client device 102 or configuration device 110. Review module 346 could include one or more user-interface elements that allow a user to play back a recorded audio stream 304 and/or video stream 302 of an interview and/or perform scrubbing or seeking during the playback. Review module 346 could also display sentences 328 in transcript 310, indicate speakers associated with sentences 328 (e.g., by displaying the speaker name above one or more consecutive sentences associated with the speaker), and/or visually indicate interrogatory 432 and/or answer 434 dialogue acts 430 in sentences 328 (e.g., by visually distinguishing between interrogatory 432 and answer 434 dialogue acts 430 using bold font, highlighting, color, and/or in another manner). Review module 346 could also, or instead, identify cues 320 and/or attributes 318 that were included in script 326 but not matched to sentences 328 in transcript 310. When the user selects a given sentence in transcript 310, review module 346 could optionally "jump" to a portion of audio stream 304 and/or video stream 302 that corresponds to a start time of the sentence. Review module 346 could additionally allow the user to generate a summary of the interview and/or a candidate's performance in the interview, rate the candidate's possession of skills or attributes 318, and/or provide other overall feedback related to the interview. Review module 346 could also, or instead, allow the user to select a portion of a sentence or a speaker's utterance; change the dialogue act type associated with the selected portion; change the speaker associated with the selected portion; add, edit, or remove attributes 318 associated with the selected portion; label the selected portion as a "strength," "concern," or "note"; add a comment related to the selected portion; rate the usefulness of the selected portion in assessing or predicting the candidate's possession of a skill or attribute; and/or provide additional feedback related to the selected portion.

In some embodiments, analysis engine 250 updates taxonomy 324, transcript 310, annotations 312, and/or machine learning models 348 based on user input 306 received through interaction module 344 and/or review module 346. First, analysis engine 250 can train or retrain one or more machine learning models 348 based on user input 306. For example, analysis engine 250 could generate training data that includes sentences 328 and dialogue acts 430 that have been selected for these sentences by users within review module 346. Analysis engine 250 could use the training data to update the parameters of embedding layers 402 and/or classification layers 404, thereby improving the accuracy of dialogue acts 430 predicted for subsequent sentences 328. In another example, analysis engine 250 could generate training data that includes pairs of sentences 328 and cues 320 identified by users as corresponding to these sentences 328. Analysis engine 250 could use the training data to update the parameters of embedding layers 406 and/or other machine learning models 348 related to generating matches 458, thereby improving the accuracy of subsequent matches 458 between sentences 328 and cues 320. In a third example, analysis engine 250 could generate training data that includes pairs of sentences 328 and attributes 318 identified by users as related to these sentences 328. Analysis engine 250 could use the training data to update the parameters of embedding layers 408 and/or other machine learning models 348 related to generating matches 468, thereby improving the accuracy of subsequent matches 468 between sentences 328 and attributes 318.

Second, analysis engine 250 can update taxonomy 324 based on user feedback. As mentioned above, mappings in taxonomy 324 can be associated with numeric weights, where each weight represents the "strength" of a relationship between a role and an attribute, an attribute and a cue, a role and a cue, and/or any other two elements mapped to one another within taxonomy 324. Analysis engine 250 can increase a weight associated with the mapping between two elements when user input 306 indicates that that the two elements are linked or related (e.g., a cue is rated highly in assessing a given attribute, a candidate is rated highly or hired for a role and strongly possesses an attribute that is associated with the role, etc.). Conversely, analysis engine 250 can decrease the weight when user input 306 indicates that the two elements are not linked or related (e.g., a cue is rated as not useful in assessing an attribute, a candidate is rated highly or hired for a role and has a low rating on an attribute that is related to the role, etc.). Consequently, taxonomy 324 and/or machine learning models 348 improve as user feedback related to transcript 310, script 326, and/or output of machine learning models 348 is received.

Third, analysis engine 250 can update transcript 310 and/or annotations 312 based on user feedback. For example, analysis engine 250 could update one or more portions of transcript 310 and/or one or more annotations 312 with speakers 330, dialogue act types, attributes 318, and/or other types of user input 306 received through interaction module 344 and/or review module 346. Analysis engine 250 could also, or instead, generate updated matches 458 between sentences 328 and cues 320 in script 326 and/or generate updated matches 468 between sentences 328 and attributes 318 in taxonomy 324 based on user input 306 that includes updates to speakers 330, dialogue act types, and/or other portions of transcript 310 or annotations 312.

While the functionality of build engine 230, processing engine 240, analysis engine 250, and user interface 340 has been described above respect to interviews, those skilled in the art will appreciate that the systems of FIGS. 1-3 can be adapted to other types of interactions or events. For example, the systems of FIGS. 1-3 could be used to plan, conduct, and/or evaluate meetings, presentations, performances, question and answer sessions, webinars, auditions, exams, questionnaires, screenings, and/or other types of events involving multiple users and/or specific types of content.

Figure 5:
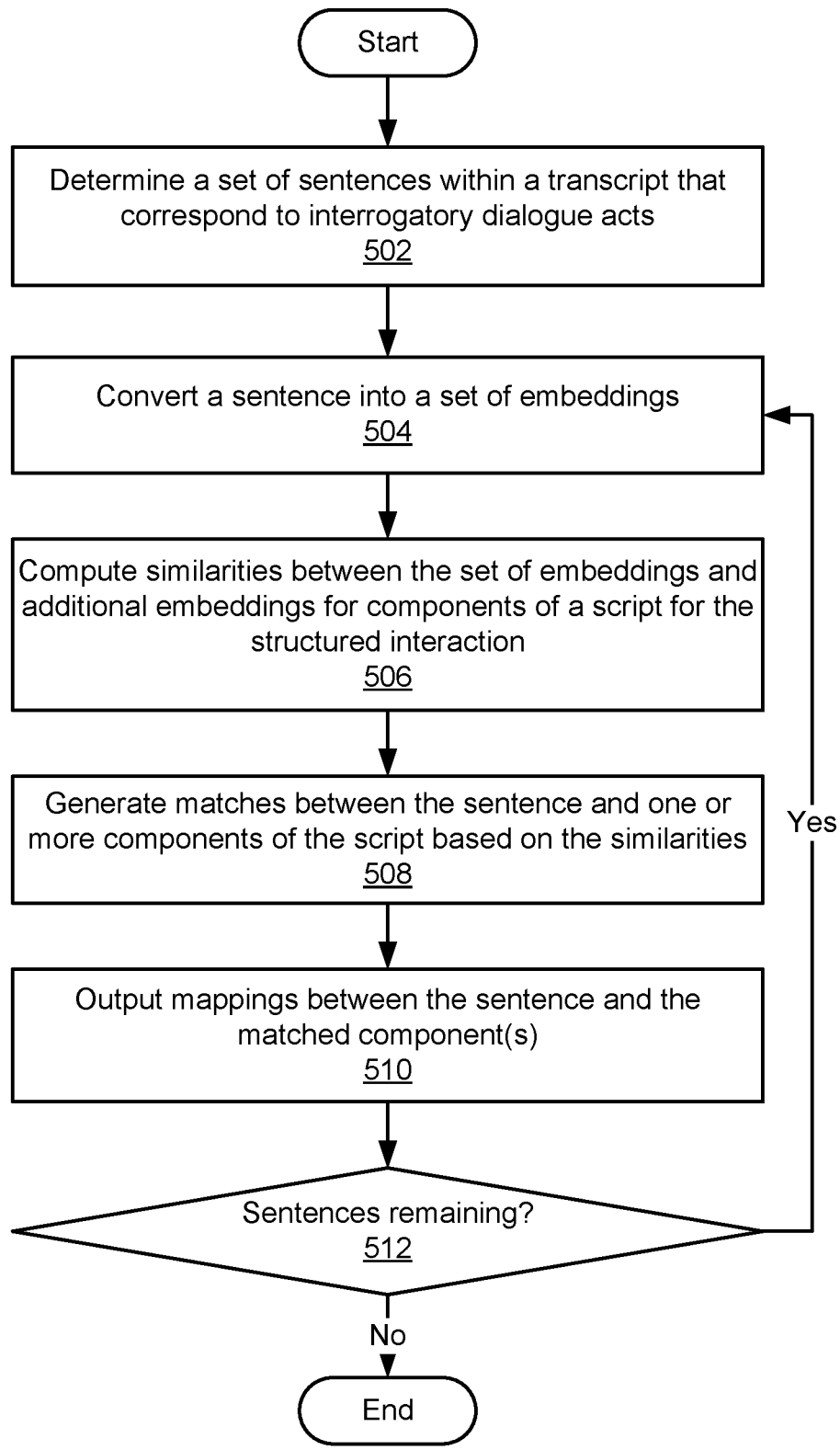
FIG. 5 is a flow diagram of method steps for analyzing a transcript of a structured interaction, according to various embodiments.

FIG. 5 is a flow diagram of method steps for analyzing a transcript of a structured interaction, according to various embodiments. Although the method steps are described in conjunction with the systems of FIGS. 1-3, persons skilled in the art will understand that any system configured to perform the method steps in any order falls within the scope of the present disclosure.

In step 502, analysis engine 250 determines a set of sentences within the transcript that correspond to interrogatory dialogue acts. For example, analysis engine 250 could use an encoder neural network to generate a fixed-length vector representation of each sentence. Analysis engine 250 could also apply a classifier to the fixed-length vector representation to generate one or more labels or scores that indicate whether the sentence is an interrogatory, an answer to an interrogatory, or another type of dialogue act.

In step 504, analysis engine 250 converts a sentence identified in step 502 into a set of embeddings. For example, analysis engine 250 could generate a TF-IDF vector representing the sentence. Analysis engine 250 could also, or instead, use an embedding model to generate embeddings of individual words in the sentence and/or an embedding representing the entire sentence.

In step 506, analysis engine 250 computes similarities between the set of embeddings and additional embeddings for components of a script for the structured interaction. The components can include cues and/or attributes to be assessed using the cues. Continuing with the above example, analysis engine 250 could compute cosine similarities, Euclidean distances, dot products, and/or other measures of vector similarity between the TF-IDF vector representing the sentence and additional TF-IDF vectors representing cues or attributes in the script. Analysis engine 250 could also compute vector similarities between one or more embeddings of the sentence and additional embeddings of the cues or attributes. Analysis engine 250 could sum, average, and/or otherwise combine the vector similarities between the sentence and each cue or attribute into an overall similarity between the sentence and the cue or attribute.

In step 508, analysis engine 250 generates matches between the sentence and one or more components of the script based on the similarities. Continuing with the above example, analysis engine 250 could match the sentence to a cue in the script with the highest overall similarity to the sentence. In another example, analysis engine 250 could match the sentence to one or more attributes with overall similarities that exceed a threshold. In a third example, analysis engine 250 could omit matches between the sentence and a cue or attribute in the script when all overall similarities between the sentence and cues or attributes in the script fail to meet a threshold.

In step 510, analysis engine 250 and/or user interface 340 output mappings between the sentence and the matched component(s). For example, analysis engine 250 and/or user interface 340 could generate user-interface elements that link the sentence to a matching cue in the script. In another example, analysis engine 250 and/or user interface 340 could display a set and/or ranking of attributes that are matched to the sentence. Analysis engine 250 and/or user interface 340 can also skip step 510 if no matches were generated in step 508.

In step 512, analysis engine 250 determines whether sentences in the set determined in step 502 remain. For example, analysis engine 250 could determine that sentences in the set remain when steps 504-510 have not been performed for all sentences determined in step 502. Thus, for each sentence determined to be an interrogatory dialogue act in step 502, analysis engine 250 performs step 504 to generate a set of embeddings representing the sentence. Analysis engine 250 also performs step 506 to generate similarities between embeddings of the sentence and additional embeddings for components of the script. Analysis engine 250 further performs step 508 to match the sentence to relevant cues and/or attributes in the script. Finally, analysis engine 250 and/or user interface 340 perform step 510 to generate output related to the matches generated in step 508.

In sum, the disclosed techniques use NLP and machine learning techniques to process structured interactions. The structured interactions can be represented by scripts that denote topics, cues, questions, and/or other types of content to be covered in the structured interactions. The structured interactions can also, or instead, be represented by recordings of the structured interactions, transcripts of the recordings, and/or user input (e.g., notes, ratings, messages, screenshares, file shares, etc.) generated before, during, or after the structured interactions.

A build engine generates a script for a structured interaction based on a taxonomy that organizes roles, attributes, cues, and/or other elements related to the structured interaction. The build engine receives user input that specifies a role and/or one or more attributes associated with the structured interaction. The build engine uses the taxonomy to retrieve cues that are mapped to the role and/or attribute(s) and generates the script as a list of cues to be used in the structured interaction. The script can also include an amount of time to be spent on the discussion related to each cue, the purpose of each cue, notes or suggestions related to each cue, and/or other information that can be used to conduct a discussion related to each cue.

A processing engine performs processing of data that is collected during the structured interaction. For example, the processing engine could generate a transcript of the structured interaction from a recording of the structured interaction. The processing engine could also map portions of the transcript to notes, comments, messages, ratings, gestures, facial expressions, and/or other user input or actions from one or more users participating in the structured interaction.

An analysis engine uses NLP and/or machine learning techniques to analyze the script, transcript, recording, user input, user actions, and/or other data generated by the build engine and/or processing engine. The analysis engine generates embeddings of sentences, utterances, and/or other portions of the transcript. The analysis engine applies one or more classification layers to the embeddings to predict interrogatory, answer, and/or other types of dialogue acts represented by the portions of the transcript. The analysis engine also computes similarities between the embeddings and additional embeddings representing cues and/or attributes and matches portions of the transcript to the cues and/or attributes based on the similarities. Output generated by the analysis engine can be used to label interrogatories, answers, and/or other types of dialogue acts in the recording or transcript; match portions of the transcript and/or recording of the structured interaction to the relevant portions of the script; and/or determine topics, skills, or other attributes that are relevant to portions of the transcript and/or recording.

One technical advantage of the disclosed techniques relative to the prior art is that computer-based tools for planning, conducting, and reviewing a structured interaction are adapted to the structure or content of the interaction. Accordingly, the disclosed techniques reduce user input, resource overhead, and/or time required to conduct and evaluate structured interactions on computer-based platforms, compared with conventional techniques that involve the use of general-purpose applications to generate or analyze content or data related to structured interactions. Another technical advantage of the disclosed techniques is the generation of a transcript that is "enriched" with dialogue acts, attributes, and/or mappings to portions of a corresponding script. Consequently, the transcript improves the analysis and review of a corresponding structured interaction, compared with a conventional transcript that includes only utterances and speakers associated with the utterances. These technical advantages provide one or more technological improvements over prior art approaches.

1. In some embodiments, a computer-implemented method for analyzing a transcript of a structured interaction comprises determining a first portion of the transcript that corresponds to a first dialogue act; matching the first portion of the transcript to a first component of a script for the structured interaction based on a first set of embeddings for the first portion of the transcript and a second set of embeddings associated with the first component of the script; and causing a first mapping between the first portion of the transcript and the first component to be outputted.

2. The computer-implemented method of clause 1, wherein determining the first portion of the transcript that corresponds to the first dialogue act comprises executing an encoder neural network that converts the first portion of the transcript into one or more embeddings; and applying one or more classification layers to the one or more embeddings to determine the first dialogue act associated with the first portion.

3. The computer-implemented method of any of clauses 1-2, wherein determining the first portion of the transcript that corresponds to the first dialogue act further comprises determining a sentence within the transcript that corresponds to the first portion.

4. The computer-implemented method of any of clauses 1-3, wherein the first dialogue act comprises an interrogatory.

5. The computer-implemented method of any of clauses 1-4, wherein matching the first portion to the first component of the script comprises converting the first portion of the transcript into the first set of embeddings; and computing one or more similarities between the first set of embeddings and the second set of embeddings.

6. The computer-implemented method of any of clauses 1-5, wherein converting the first portion of the transcript into the first set of embeddings comprises executing an embedding model that generates an embedding representing a sequence of words in the first portion of the transcript.

7. The computer-implemented method of any of clauses 1-6, wherein converting the first portion of the transcript into the first set of embeddings comprises generating a term frequency-inverse document frequency (TF-IDF) vector for the first portion of the transcript.

8. The computer-implemented method of any of clauses 1-7, wherein matching the first portion of the transcript to the first component of the script comprises generating the second set of embeddings for a cue corresponding to the first component of the script.

9. The computer-implemented method of any of clauses 1-8, wherein matching the first portion of the transcript to the first component of the script comprises determining a plurality of cues associated with a skill corresponding to the first component of the script; and computing the second set of embeddings for the plurality of cues.

10. The computer-implemented method of any of clauses 1-9, wherein matching the first portion of the transcript to the first component of the script further comprises aggregating the second set of embeddings into an embedding for the skill.

11. The computer-implemented method of any of clauses 1-10, further comprising determining a lack of match between a portion of the transcript and a second component of the script; and outputting an indication that the second component of the script is not included in the structured interaction.

12. The computer-implemented method of any of clauses 1-11, wherein causing the first mapping between the first portion of the transcript and the first component of the script to be outputted comprises outputting the first portion of the transcript, the first component of the script, and a recording of the first portion of the transcript within a user interface.

13. In some embodiments, one or more non-transitory computer readable media store instructions that, when executed by one or more processors, cause the one or more processors to perform the steps of determining a first portion of a transcript that corresponds to a first dialogue act; matching the first portion of the transcript to a first component of a script for a structured interaction based on a first set of embeddings for the first portion of the transcript and a second set of embeddings associated with the first component of the script; and causing a first mapping between the first portion of the transcript and the first component to be outputted.

14. The one or more non-transitory computer readable media of clause 13, wherein the instructions further cause the one or more processors to perform the steps of outputting a first indication of the first dialogue act in association with the first portion of the transcript; and outputting a second indication of a second dialogue act in association with a second portion of the transcript that follows the first dialogue act in the transcript.

15. The one or more non-transitory computer readable media of any of clauses 13-14, wherein the first dialogue act comprises an interrogatory and the second dialogue act comprises an answer.

16. The one or more non-transitory computer readable media of any of clauses 13-15, wherein matching the first portion to the first component of the script comprises converting the first portion of the transcript into the first set of embeddings; and computing one or more similarities between the first set of embeddings and the second set of embeddings.

17. The one or more non-transitory computer readable media of any of clauses 13-16, wherein converting the first portion of the transcript into the first set of embeddings comprises generating a first term frequency-inverse document frequency (TF-IDF) vector for the first portion of the transcript based on a vocabulary associated with the transcript; and executing an embedding model that generates a first embedding representing a sequence of words in the first portion of the transcript.

18. The one or more non-transitory computer readable media of any of clauses 13-17, wherein matching the first portion of the transcript to the first component of the script comprises computing a first similarity between the first TF-IDF vector and a second TF-IDF vector for the first component of the script; computing a second similarity between the first embedding and a second embedding for the first component of the script; aggregating the first similarity and the second similarity into an overall similarity between the first portion of the transcript and the first component of the script; and matching the first portion of the transcript to the first component of the script based on the overall similarity.

19. The one or more non-transitory computer readable media of any of clauses 13-18, wherein matching the first portion of the transcript to the first component of the script further comprises aggregating a plurality of embeddings for a plurality of cues into the second embedding for an attribute that is associated with the plurality of cues and corresponds to the first component of the script; and aggregating a plurality of TF-IDF vectors for the plurality of cues into the second TF-IDF vector for the attribute.

20. In some embodiments, a system comprises one or more memories that store instructions, and one or more processors that are coupled to the one or more memories and, when executing the instructions, are configured to determine a first portion of a transcript that corresponds to an interrogatory dialogue act; match the first portion of the transcript to a first component of a script for a structured interaction based on a first set of embeddings for the first portion of the transcript and a second set of embeddings associated with the first component of the script; and cause a first mapping between the first portion of the transcript and the first component to be outputted.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for analyzing a transcript of a structured interaction, the method comprising:
    determining that a first portion of the transcript corresponds to a first dialogue act;
    matching the first portion of the transcript to a first component of a script for the structured interaction by:
        generating a first term frequency-inverse document frequency (TF-IDF) vector for the first portion of the transcript based on a vocabulary associated with the transcript;
        executing an embedding model that generates a first embedding representing a sequence of words in the first portion of the transcript;
        aggregating a plurality of embeddings for a plurality of cues in the script into a second embedding for an attribute that is associated with the plurality of cues and corresponds to the first component of the script;
        aggregating a plurality of TF-IDF vectors for the plurality of cues into a second TF-IDF vector for the attribute;
        aggregating (i) a first similarity between the first TF-IDF vector and the second TF-IDF vector and (ii) a second similarity between the first embedding and the second embedding for the first component of the script into an overall similarity between the first portion of the transcript and the first component of the script; and
        matching the first portion of the transcript to the first component of the script based on the overall similarity;
    outputting, in a user interface, a first mapping between the first portion of the transcript and the first component of the script;
    receiving, via the user interface, user input associated with the first mapping; and
    training the embedding model based on the user input.

2. The computer-implemented method of claim 1, wherein determining the first portion of the transcript that corresponds to the first dialogue act comprises:
    executing an encoder neural network that converts the first portion of the transcript into one or more embeddings; and
    applying one or more classification layers to the one or more embeddings to determine the first dialogue act associated with the first portion of the transcript.

3. The computer-implemented method of claim 2, wherein determining the first portion of the transcript that corresponds to the first dialogue act further comprises determining a sentence within the transcript that corresponds to the first portion.

4. The computer-implemented method of claim 2, wherein the first dialogue act comprises an interrogatory.

5. The computer-implemented method of claim 1, wherein the embedding model comprises at least one of a Bidirectional Encoder Representations from Transformers (BERT) model or a bidirectional gated recurrent unit (GRU).

6. The computer-implemented method of claim 1, wherein the plurality of cues comprises at least one of a question, a prompt, or a topic included in the first component of the script.

7. The computer-implemented method of claim 1, wherein
    the attribute comprises a skill.

8. The computer-implemented method of claim 1, further comprising:
    determining a lack of match between a portion of the transcript and a second component of the script; and
    outputting an indication that the second component of the script is not included in the structured interaction.

9. The computer-implemented method of claim 1, wherein outputting the first mapping between the first portion of the transcript and the first component of the script comprises outputting the first portion of the transcript, the first component of the script, and a recording of the first portion of the transcript within the user interface.

10. The computer-implemented method of claim 1, wherein the overall similarity is computed using at least one of a sum, a weighted sum, or an average of the first similarity and the second similarity.

11. One or more non-transitory computer readable media storing instructions that, when executed by one or more processors, cause the one or more processors to perform operations comprising:
    determining that a first portion of a transcript corresponds to a first dialogue act;
    matching the first portion of the transcript to a first component of a script for a structured interaction by:
        generating a first term frequency-inverse document frequency (TF-IDF) vector for the first portion of the transcript based on a vocabulary associated with the transcript;
        executing an embedding model that generates a first embedding representing a sequence of words in the first portion of the transcript;
        aggregating a plurality of embeddings for a plurality of cues in the script into a second embedding for an attribute that is associated with the plurality of cues and corresponds to the first component of the script;

aggregating a plurality of TF-IDF vectors for the plurality of cues into a second TF-IDF vector for the attribute;

aggregating (i) a first similarity between the first TF-IDF vector and the second TF-IDF vector and (ii) a second similarity between the first embedding and the second embedding for the first component of the script into an overall similarity between the first portion of the transcript and the first component of the script; and matching the first portion of the transcript to the first component of the script based on the overall similarity;

outputting, in a user interface, a first mapping between the first portion of the transcript and the first component of the script;

receiving, via the user interface, user input associated with the first mapping; and training the embedding model based on the user input.

12. The one or more non-transitory computer readable media of claim 11, wherein the operations further comprise:

outputting a first indication of the first dialogue act in association with the first portion of the transcript; and outputting a second indication of a second dialogue act in association with a second portion of the transcript that follows the first dialogue act in the transcript.

13. The one or more non-transitory computer readable media of claim 12, wherein the first dialogue act comprises an interrogatory and the second dialogue act comprises an answer.

14. The one or more non-transitory computer readable media of claim 11, wherein
the vocabulary comprises a set of words included in the transcript.

15. The one or more non-transitory computer readable media of claim 11, wherein
the first similarity and
the second similarity comprise at least one of a dot product, a cosine similarity, or a Euclidean distance.

16. A system, comprising:
one or more memories that store instructions, and
one or more processors that are coupled to the one or more memories and, when executing the instructions, are configured to:

determine that a first portion of a transcript corresponds to an interrogatory dialogue act;

match the first portion of the transcript to a first component of a script for a structured interaction by:

generating a first term frequency-inverse document frequency (TF-IDF) vector for the first portion of the transcript based on a vocabulary associated with the transcript;

executing an embedding model that generates a first embedding representing a sequence of words in the first portion of the transcript;

aggregating a plurality of embeddings for a plurality of cues in the script into a second embedding for an attribute that is associated with the plurality of cues and corresponds to the first component of the script;

aggregating a plurality of TF-IDF vectors for the plurality of cues into a second TF-IDF vector for the attribute;

aggregating (i) a first similarity between the first TF-IDF vector and the second TF-IDF vector and (ii) a second similarity between the first embedding and the second embedding for the first component of the script into an overall similarity between the first portion of the transcript and the first component of the script; and matching the first portion of the transcript to the first component of the script based on the overall similarity;

output, in a user interface, a first mapping between the first portion of the transcript and the first component of the script;

receive, via the user interface, user input associated with the first mapping; and train the embedding model based on the user input.

* * * * *